Patented Aug. 29, 1939

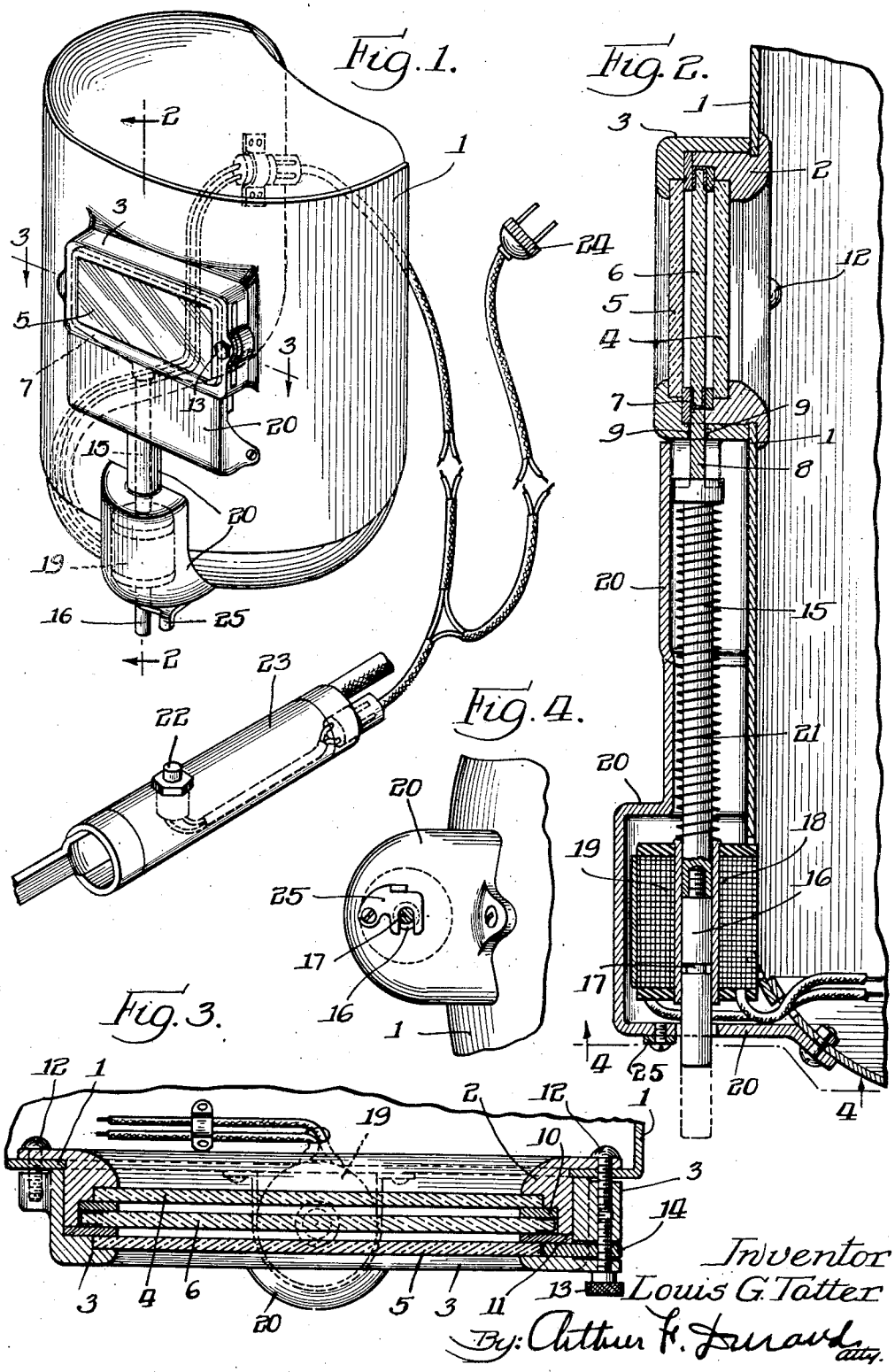

2,171,052

UNITED STATES PATENT OFFICE 2,171,052

WELDING SHIELD

Louis G. Tatter, Chicago, Ill.

Application January 28, 1938, Serial No. 187,415

6 Claims. (Cl. 2—8)

This invention relates to welding shields, or shields for similar purposes, such as those used to protect the eyes against the injurious rays of the electric arc used for welding, or for other purposes.

Generally stated, the object of the invention is to provide a novel and improved construction and arrangement whereby the shield is provided with a framed window having colored or shaded glass therein, to protect the eyes, and is also provided with means for moving the colored or shaded glass to provide an area of clear vision, through clear glass, when it is desired to momentarily inspect the work, and whereby the movement of the colored or shaded glass is electrically controlled, preferably by a push-button, or other switch, on the tool or so-called electrode holder with which the welding is being done, thus obviating the necessity of using one hand to manually open the window, so to speak, when the said area of clear vision is desired.

It is also an object to provide certain details of construction tending to increase the efficiency and desirability of a shield having a window of this particular character.

To the foregoing and other useful ends, the invention consists in matters hereinafter set forth and claimed and shown in the accompanying drawing, in which—

Fig. 1 is a perspective of a welding shield embodying the principles of the invention.

Fig. 2 is an enlarged vertical section on line 2—2 in Fig. 1 of the drawing.

Fig. 3 is an enlarged horizontal section on line 3—3 in Fig. 1 of the drawing.

Fig. 4 is a detail sectional view, looking upward, on line 4—4 in Fig. 2 of the drawing.

As thus illustrated, the invention comprises a shield body 1, made of suitable material, such as fiber, shaped to cover the face and be supported on the head or shoulders of the user. The front of said shield body is provided with a window having inner and outer frame members 2 and 3, in which are suitably supported the inner and outer sections of clear glass 4 and 5, between which sections a section of colored or shaded glass 6 is disposed in position to normally close the window, so to speak, against the dangerous or injurious rays of the electric arc with which the welding is done. It will be seen that the inside member projects outwardly through the shield body 1, as shown in Fig. 2 of the drawing, and that the projecting portion is covered and concealed by the outer member 3, with the edge portions of the shield body 1 gripped tightly in the groove formed in the member 2, as shown in Fig. 2 of the drawing. The section 6 has a sheet metal frame 7, to the lower edge of which is suitably fastened a plate 8, and this plate, with the section 6 and its frame, are movable up and down in a slot 9 in the bottom of the window frame. In this way, the section 6 can be pulled down, either partially or fully, to create an area of clear vision above its upper edge, through the clear glass 4 and 5, when the user desires to inspect the work.

Plates 10 and 11 are preferably interposed between the glass sections 4, 5 and 6, to space them apart, and screws 12 are inserted outwardly through the frame member 2 and into threaded sockets in the frame member 3, to clamp the glass tightly between the window frame parts. Also, a screw 13 is inserted through the outer member 3, and through the plate 14, into the member 3, to hold said plate in position. When it is desired to remove the outer glass section 5, when it has become pitted by use, the screw 13 can be removed, allowing the plate 14 to drop out, and the section 5 will then slide out endwise, and a new section can be inserted.

For the operation of the section 6, a vertical rod 15 has its upper end rigidly connected or united with the plate 8, this rod being preferably of steel, and the lower end of the rod having a fiber or other non-metallic extension 16 detachably connected to the lower end thereof. The extension 16 preferably has an annular groove 17 formed at the middle thereof. The said rod and its extension are arranged to slide up and down in a tube 18 that forms the core of an electric solenoid 19, suitably secured within the housing 20, which latter is separate from the framing of the window, and is suitably secured to the front of the shield body so that the said operating rod and the solenoid are protected and concealed from view. A coil spring 21, on the rod 15, serves to yieldingly hold the latter and the section 6 in normal or raised position, as shown in Fig. 2 of the drawing. The circuit of said solenoid 19 is preferably controlled by a push-button 22 on the handle 23 of the tool or holder with which the electric welding is being done. The said circuit has a plug 24 for insertion in an ordinary electric outlet or source of current suitable for energizing the said solenoid. When the circuit is closed, by merely placing a thumb on the said push-button 22, the rod 15 is pulled downward, this movement being suitably limited to provide either a partial opening of the window, or a full opening thereof. When the section 6 is partially down, so that its upper edge is about midway in the window, a pivoted latch 25 on the under side of the housing 20 may be swung into position to engage the groove 17, thereby to hold the section 6 in its partially open position, if such is desirable or necessary.

With this construction and arrangement, the user or operator of the electric welding tool or holder does not need to use one hand for manually operating the adjustable window. If it is desired to inspect the work, momentarily, while the welding arc is turned off, the operator will simply put a thumb on the push-button 22, thereby electrically controlling the window and causing it to open, so to speak, in the desired manner, by pulling down the colored or shaded section of glass, thereby providing an area of clear vision through the uncolored or transparent glass above the upper edge of the movable section of the colored or shaded glass.

It will be seen that the housing 20 has an upper relatively large portion that is practically as wide as the window frame, and that conceals the movable glass when the latter moves downwardly. In addition, the said housing has a reduced portion substantially at its middle, to enclose the vertical rod that reciprocates up and down therein. Again, the latch 25, it will be observed, operates on a horizontal frame on the bottom of the housing 20, to laterally engage the solenoid armature, and to hold the latter down.

Also, it will be seen that all movable parts are outside of the body or mask, and that they all have movement only up and down, and that the solenoid itself is practically entirely outside of the said body or mask, so that nothing protrudes inside to annoy the user or interfere with his work.

What I claim as my invention is:

1. In a shield or helmet, to prevent light from injuring the eyes, a body, a window frame in the front of said body, with vertically movable and fixed glass therein, guides for the vertically movable glass, a housing secured to the front of said body, below said frame, with the upper end portion of said housing forming a chamber to receive and conceal the movable glass, an electric solenoid enclosed in the lower end portion of said housing, practically entirely outside said body, a vertical rod operated by said solenoid, to actuate said movable glass up and down, a hand switch having cord connection with a source of current and with said solenoid, obviating the necessity of using any electric switching means inside the body to cause reciprocation of said rod, and a spring on said rod co-operating with said solenoid to effect said reciprocation, all on the outside of said body, having a latch operable in a horizontal plane on the bottom of said housing to laterally engage and hold said rod down.

2. In a shield or helmet, to prevent light from injuring the eyes, a body, a window frame in the front of said body, with vertically movable and fixed glass therein, guides for the vertically movable glass, a housing secured to the front of said body, below said frame, with the upper end portion of said housing being enlarged and thereby forming a chamber to receive and conceal the movable glass, when the latter is pulled downward, an electric solenoid enclosed in the lower end portion of said housing, practically entirely outside said body, a vertical rod operated by said solenoid, to actuate said movable glass up and down, a hand switch having cord connection with a source of current and with said solenoid, obviating the necessity of using any electric switching means inside the body to cause reciprocation of said rod, and a spring on said rod co-operating with said solenoid to effect said reciprocation, all on the outside of said body, with the upper end of the solenoid forming a fixed shoulder for the lower end of said spring.

3. A structure as specified in claim 2, said frame being partly removable inwardly and partly outwardly, from its position above said external housing, by means of screws at one end of the frame.

4. A structure as specified in claim 2, having a latch operable in a horizontal plane on the bottom of said housing to laterally engage and hold said rod down.

5. A structure as specified in claim 2, said housing having a reduced portion for said rod, disposed between and integral with said upper and lower end portions thereof, the lower end portion being enlarged to form a chamber for the solenoid.

6. A structure as specified in claim 2, said housing and frame being separable at the bottom of the latter, and the housing being removable separately from the body.

LOUIS G. TATTER.